June 5, 1934. A. A. JIMENEZ ET AL Re. 19,198

PATTERN SHEET CONTROLLED MECHANISM FOR ILLUMINABLE SIGNS

Original Filed June 28, 1930 2 Sheets-Sheet 1

INVENTORS:
Alfredo A. Jiminez
Julio C. Jiminez
BY
Morrison, Kennedy + Campbell
ATTORNEYS.

June 5, 1934. A. A. JIMENEZ ET AL Re. 19,198

PATTERN SHEET CONTROLLED MECHANISM FOR ILLUMINABLE SIGNS

Original Filed June 28, 1930 2 Sheets-Sheet 2

INVENTORS;
Alfredo A. Jiminez
Julio C. Jiminez
BY
Morrison, Kennedy & Campbell
ATTORNEYS.

Reissued June 5, 1934

Re. 19,198

UNITED STATES PATENT OFFICE 19,198

PATTERN SHEET CONTROLLED MECHANISM FOR ILLUMINABLE SIGNS

Alfredo A. Jimenez and Julio C. Jimenez, Habana, Cuba

Original No. 1,844,770, dated February 9, 1932, Serial No. 464,639, June 28, 1930. Application for reissue February 6, 1934, Serial No. 710,026. In Cuba September 3, 1929

9 Claims. (Cl. 200—46)

This invention is a novel pattern-sheet controlled switch mechanism designed primarily for use in connection with luminous electric signs of the class known as traveling message signs; but it is to be understood that a circuit controller in accordance with this invention may be employed for any purposes for which it is found applicable. The invention has for its object to provide in a manner as hereinafter set forth for controlling an illuminable display, from a signboard or other object.

A further object of the invention is to provide a controlling device for the purpose referred to capable of performing its function when the signboard or other object upon which the display is to be had is located at a point remote from the switching mechanism.

Further objects of the invention are to provide a circuit controller for the purpose referred to which is comparatively simple in its construction and arrangement, strong, durable, compact, thoroughly efficient in its use, readily assembled and comparatively inexpensive to manufacture.

In the drawings:—

Figure 4:
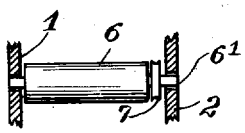

Fig. 4 in side elevation shows one of the rollers of a circular series, upon which the circuit controlling element travels.

Figures 2, 5, 6, 7:
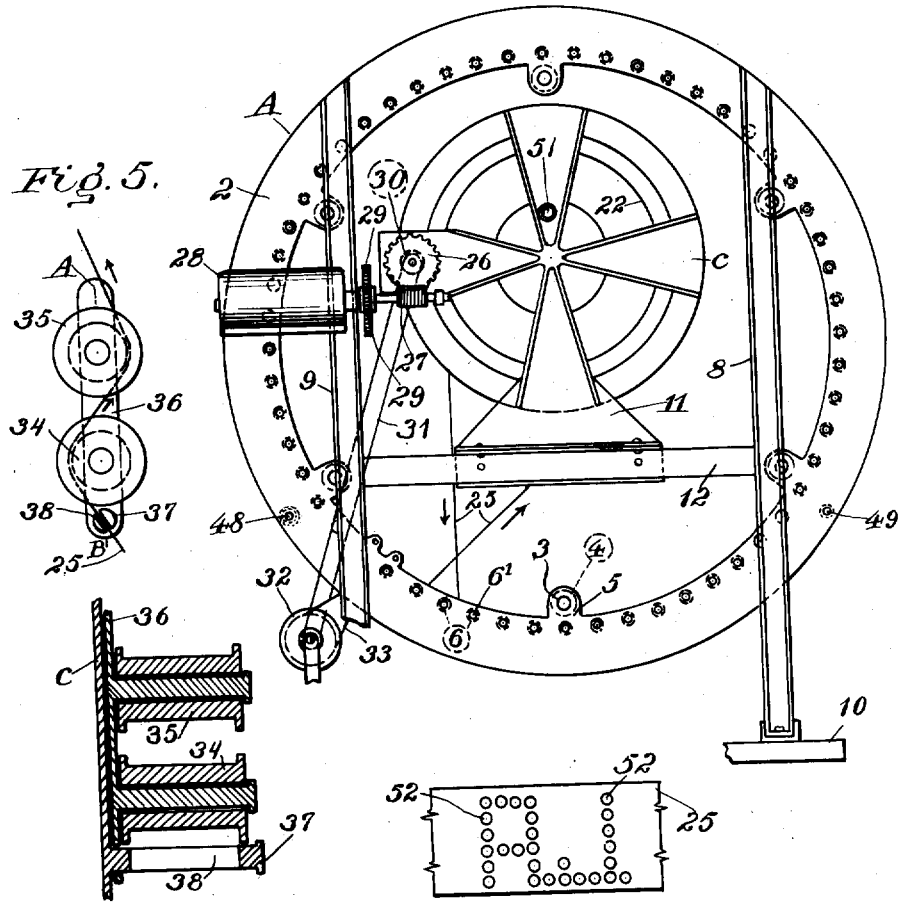
Fig. 2 is a partial view in rear elevation.

Fig. 5 is a detail of the inside rollers serving to guide the circuit controlling sheet to the control point.

Fig. 6 is a section taken along line A—B Fig. 5.

Fig. 7 is a face view of the circuit controlling element or sheet in the form of a ribbon or film in which, as an example, a pattern in the form of letters A. J. is provided by perforations.

A non-rotary circular support A is shown in the form of a fixed spool or drum formed by front and rear rings 1 and 2 joined and maintained in fixed spaced relation by bolts 3 and spacers 4 arranged between and secured to lugs 5 extending inwardly from the inner edge of rings 1 and 2. Between said rings and near the inner edges thereof are rollers 6 in an endless or circular series, for guiding the convolutions of the control sheet or band 25. These guide rollers 6 are carried by shafts 6′ which project from the ends of the rollers. For the purpose of making all said rollers 6 drivers, to assist advancing the band, each shaft 6′ is provided with a pulley 7 rigidly mounted near one of the ends of the roller. The preferred position of the spool A is vertical and it is sustained by means of supports 8 and 9, secured to base 10.

The circuit controlling or switching mechanism B is mounted interiorly of spool A, to which it is secured by means of a spider C, suitably held by a bracket 11 fixed to a horizontal member 12, having its ends attached to a pair of lugs 5 of ring 1. The mechanism B includes a motor 28 supported upon rear ring 2.

Spider C has secured to it a holder or curved plate 14 of dielectric material, for supporting a system of contacts. In the plate are formed openings 15 wherein are lodged metallic tubes 16 provided with inside and outside threads, at their upper ends, the former serving to screw on metallic caps 17 and the latter to secure bolts 18 regulating the pressure of helical springs 19 within said metallic tubes 16. The said springs have one of their ends resting on the lower part of screws 18 and the other resting on metallic balls 20. The said balls are adapted to contact the outer face of rim 21 of a metallic wheel 22, the balls and the rim constituting complementary contacts.

The wheel 22 is rotatably mounted on the spider C and is electrically insulated therefrom by means of fiber or other suitable insulation.

Figure 3:
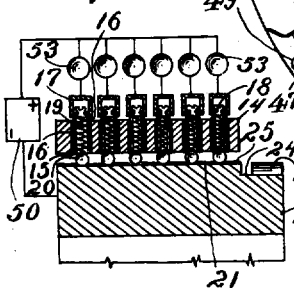
Fig. 3 is a detailed section illustrating a set of spring controlled circuit closing elements and further showing the circuit controlling element of the pattern sheet type in the form of a perforated ribbon or band and which is common to the several lighting circuits.

The rim 21 of the wheel 22 (Fig. 3) is provided with teeth 23 at one of its sides, said teeth being separated from the rest of the rim by means of an annular groove 24 serving to prevent the circuit controlling element of the pattern-sheet type, in the form of a ribbon or film 25, to be injured by the teeth or by gear 26, which imparts movement to wheel 22 by engaging the teeth 23 of the latter. The gear 26 is rotatably mounted in the spider C and is driven by a worm 27 operated by reduction gearing driven from a motor 28. The reduction gearing consists of the sprockets 29 and 29′. The wheel 22 is operated at the desired slow speed of message travel, the reduction gearing providing therefor.

The rollers 6 which guide the sheet 25 wound in several convolutions thereon may be rotated to facilitate the travel of the sheet. In order to synchronize the movement of the different parts that cooperate in the movement of the sheet or ribbon 25, a pulley or sprocket 30 is mounted upon gear 26 for the purpose of transmitting motion by means of a chain or belt 31 to a pulley 32 serving to move, simultaneously, the rollers 6 by means of a belt 33 traveling circumferentially on the series of pulleys 7.

To maintain the ribbon or sheet 25 in a correct path during its travel we provide near the lower part of rim 21 a pair of guide rollers 34 and 35, rotatably mounted on a support 36 capable of oscillating on spider C upon a shaft 37, which is provided with a slot 38, serving to allow passage therethrough of the ribbon or film 25 (Figs. 5 and 6), as will be explained hereinafter. Also near the upper part of rim 21, swingable supports 40 are provided capable of oscillating on spider C and carrying a guide roller 39. The said supports 36 and 40 are held in working position by means of opposed, oppositely acting springs 41 and 42 which are suitably secured thereto and also to a fixed central holder. In addition to the aforesaid rollers a resilient plate 44 is arranged to uphold the ribbon or sheet 25 upon issuing from holder 14. To prevent possible twisting of the ribbon or sheet 25 after passing over plate 44, a guide 46 is provided on the interior periphery of ring 1 and which is in the shape of a fork.

Figure 1:
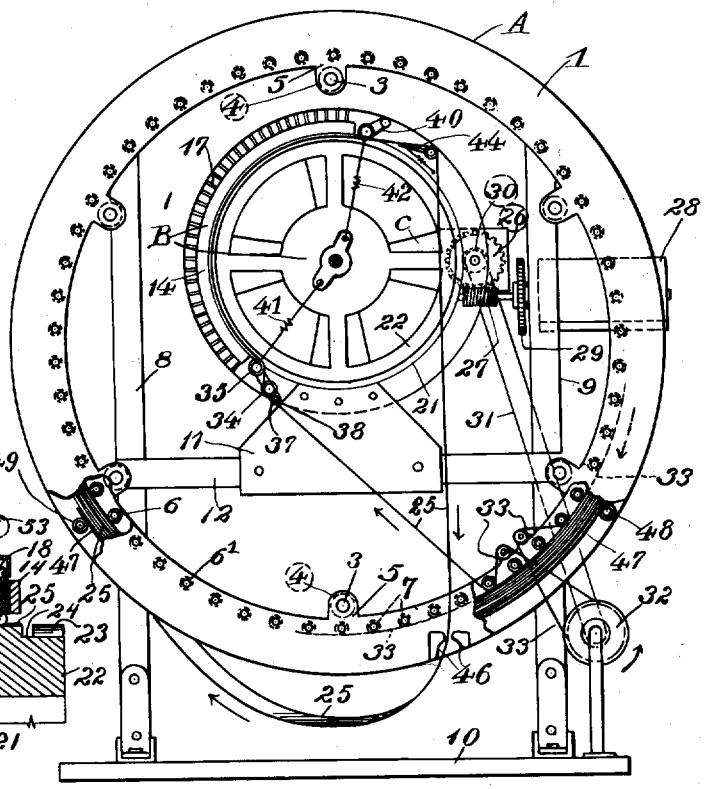
Figure 1 is a front elevation of the switch.

As the ribbon or sheet 25 after leaving wheel 22 tends to sag at the lower end of spool A, as seen in Fig. 1, such sag interfering with the proper working of the device, we provide a brake 47, in the form of a strip, secured at one of its ends to shaft 48 and having its other end sustained by a stud 49 and which allows regulation of its pressure according to the length of the ribbon wound on the spool.

As the holder 14 is of dielectric material and each of the spiral springs 19, tubes 16 and covers 17 constitute a contact, and since wheel 22 is metallic and is electrically connected to battery 50 by means of a brush, it constitutes the other contact, that is to say, when a ball 20 passes through an opening 52 in the ribbon 25 to contact with rim 21 the corresponding circuit is closed and the lamp 53 therein is illuminated.

*Operation*

(A) Take one end of control sheet or ribbon 25 with the message or advertisement perforated thereon and pass same from the outside to the inside between two rollers 6 of those occupying the second quadrant, as in Fig. 1 shown.

(B) Pull gently and pass ribbon through guide slot 38 in shaft 37.

(C) Pass the ribbon between rollers 34 and 35 (taking care that 35 mounts on the ribbon).

(D) Introduce its end in the space between curved plate or holder 14 and rim 21, and rotate wheel 22, slowly advance ribbon until its end issues through the outer end of holder 14.

(E) Pass the ribbon over the plate 44 and then between fork shaped guide 46 secured to ring 1 and let it remain so.

(F) Roll the balance of ribbon on spool A counterclockwise in Fig. 1 until end is reached, at which time both ends thereof are to be permanently attached to each other, taking care to allow sufficient sag; and apply the brake 47 to the outer convolution above the sagging length thereof or with an aperture in the brake for the passage of the ribbon.

(G) Start the motor 28 which, through worm 27 and gears 29′, 29 and 26 imparts clockwise rotation to wheel 22 which will impart motion to ribbon 25, forcing same to advance. Once the ribbon is in motion, every time a perforation 52 coincides with a ball 20, the corresponding circuit will be closed, lighting the corresponding lamp 53 of the board or signboard, the plurality of lighted lamps producing the words or message constituting the matter to be displayed, and at the same time giving progressive motion or travel of the display. The foregoing operation is repeated as long as the device is in motion as the perforated ribbon is endless.

The characteristic principles of the present improvement may be summarized as follows. It operates by a traveling pattern-sheet 25 having prearranged series of circuit control devices in the form of perforations 52 for selectively determining the display or illumination of lamps 53 of an illuminable sign. This pattern-sheet cooperates with a system of individual circuit closers in the form of spring contacts 20, such contacts being operated by the control devices or perforations of the pattern-sheet and serving to open and close the corresponding lamp circuits. This general arrangement, with an endless or repeating pattern-sheet, presents the requirement of compact disposal and effective handling of the extended portion of the pattern sheet which is not in operation; and to meet this requirement the present invention is characterized by the spool or drum 1, 2 having an endless or circular series of sheet supporting studs or rollers 6 for the accommodation of the length of the pattern sheet wound thereon, the pattern sheet being disposed in a path which has a plurality of convolutions around the drum, and passing from the innermost convolution interiorly from the drum, between two of the rollers 6, and thence beneath the system of circuit closers or contacts to operate them, and thence back to the outermost convolution on the drum. The arrangement so outlined is completed by drive means for causing the advancing travel of the pattern sheet in the described endless path, for which purpose the pattern sheet, in passing beneath the system of contacts, is carried around on the traveling support or wheel 22, which wheel is turned by the motor 28 and gearing 29, 29′, 27, 26 and 23 to advance the pattern sheet through the control point, and draw it from the drum, this primary drive means being shown as optionally supplemented by connections for rotating the rollers 6 of the drum, which otherwise might be idle rollers. The brake 47 is useful as applying a drag to retard the outer convolution, and facilitate the sheet readjusting itself or collapsing on the drum as the inner convolution is fed away. The slack is shown between the control point and the outer convolution but would be between the control point and the inner convolution if the travel were reversed.

What we claim is:

1. In a pattern-sheet-controlled mechanism for operating the circuits of an illuminable sign, a rotatable wheel of conducting material interposed in and common to such circuits, a holder of dielectric material opposing a portion of said wheel, a system of spring contacts mounted on and projecting inwardly from said holder, each of said contacts interposed in one of said circuits and constituting a circuit closer therefor, a stationary drum adjacent to said wheel, a controlling pattern sheet provided with prearranged perforations, said sheet supported by the drum and traveling between said wheel and said contacts for normally maintaining the latter clear of said wheel, a series of rollers arranged in said drum for supporting said sheet while traveling thereon, and means for causing travel of the sheet between said wheel and contacts, whereby said perforations will selectively permit said contacts to engage said wheel to close the lighting circuits.

2. In a pattern-sheet-controlled switch mechanism for illuminable signs, a rotatable wheel having a rim of conducting material interposed in and common to such circuits, a holder of insulating material opposing a portion of and spaced from the rim of said wheel and provided with a set of openings, a set of spring contacts mounted in said openings and projecting inwardly from said holder, each of said contacts interposed in one of said circuits and constituting a circuit closer therefor, a non-rotary drum surrounding said wheel, a controlling element of the pattern sheet type common to said circuits and in the form of a shiftable ribbon provided with spaced perforations, said sheet supported by the drum and traveling between said wheel rim and said contacts for normally maintaining the latter clear of said rim, driven rollers arranged in said spool for shifting said ribbon therefrom, whereby said perforations will selectively permit said contacts to engage said rim to close the lighting circuits, means for rotating said wheel to drive the pattern sheet, and means operated from the means for rotating said wheel for driving said rollers to shift said ribbon.

3. A mechanism as in claim 1 and wherein is a spring pressed guard guiding the sheet to the periphery of said wheel.

4. In a pattern-sheet-controlled mechanism for operating a system of electric circuits and thereby the lamps of an illuminable sign, the combination with a traveling endless pattern-sheet having prearranged series of circuit control devices or perforations for selectively determining the display, a system of individual circuit closers operated by said control devices of the pattern-sheet and operating the lamp circuits, a storage drum having an endless series of sheet supporting studs or rollers for the accommodation of the pattern sheet wound thereon, said pattern sheet being disposed in a path having a plurality of convolutions around said drum, and passing from the innermost convolution interiorly from the drum, and thence beneath the system of circuit closers to operate them, and thence back to the outermost convolution on the drum, and drive means for causing the advancing travel of the pattern sheet in such path.

5. In a mechanism for operating a system of electric circuits and thereby the lamps of an illuminable sign of the type employing a traveling endless pattern-sheet having prearranged series of circuit control devices for selectively determining the display and a system of individual circuit closers operated by said control devices of the pattern-sheet and operating the lamp circuits, the combination of a storage drum having an endless series of sheet supporting studs or rollers for the accommodation of the pattern sheet wound thereon, and drive means for causing the advancing travel of the pattern sheet, whereby said pattern sheet may be disposed and driven in an endless path having a plurality of convolutions around said drum, and passing from the innermost convolution interiorly from the drum, and thence beneath the system of circuit closers to operate them, and thence back to the outermost convolution on the drum.

6. In a mechanism for operating a system of electric circuits and thereby the lamps of an illuminable sign, controlled by a traveling endless pattern-sheet having prearranged series of circuit control devices or perforations for selectively determining the display, the combination of a system of individual circuit closers operated by said control devices of the pattern-sheet and operating the lamp circuits, a non-rotary storage drum having an endless series of sheet supporting rollers mounted in fixed positions around the drum for the accommodation of the pattern sheet wound thereon, said pattern sheet being disposed in a path having a plurality of convolutions around said drum, and passing from the innermost convolution interiorly from the drum, and thence beneath the system of circuit closers to operate them, and thence back to the outermost convolution on the drum, and drive means for causing the advancing travel of the pattern sheet in such path.

7. A mechanism as in claim 6 and wherein is a brake means applying a retarding drag upon the outer convolution of pattern sheet on said drum.

8. In a pattern-sheet-controlled mechanism for operating a system of electric circuits and thereby the lamps of an illuminable sign, controlled by a traveling endless pattern-sheet having prearranged series of circuit control devices or perforations for selectively determining the display, the combination of a system of individual circuit closers operated by said control devices of the pattern-sheet and operating the lamp circuits, a rotary support or wheel beneath the pattern sheet opposite to said system of circuit closers, a storage drum having an endless series of sheet supporting studs or rollers for the accommodation of the pattern sheet wound thereon, said pattern sheet being disposed in a path having a plurality of convolutions around said drum, and passing from the innermost convolution interiorly from the drum, and thence beneath the system of circuit closers to operate them, and thence back to the outermost convolution on the drum, and drive means for turning the rotary support and thereby causing the advancing travel of the pattern sheet in such path.

9. In a pattern-sheet-controlled mechanism for operating a system of electric circuits and thereby the lamps of an illuminable sign, the combination with a traveling endless pattern-sheet having prearranged series of circuit control devices or perforations for selectively determining the display, a rotary wheel upon which the pattern sheet travels at the place of control, a system of individual circuit closers operated by said control devices of the pattern-sheet and operating the lamp circuits, said circuit closers located opposite to the rotary wheel, a hollow storage drum surrounding said wheel and circuit closers and having an endless series of sheet supporting studs or rollers for the accommodation of the pattern sheet wound thereon, said pattern sheet being disposed in a path having a plurality of convolutions around said drum, and passing from the innermost convolution interiorly from the drum, and thence to said rotary wheel and beneath the system of circuit closers to operate them, and thence laterally of the drum and back to the outermost convolution on the drum, and drive means for turning the wheel and causing the advancing travel of the pattern sheet in such path.

ALFREDO A. JIMENEZ.
JULIO C. JIMENEZ.